Aug. 20, 1957     H. SIEGEL ET AL     2,803,799
VOLTAGE DIVIDER CALIBRATING APPARATUS
Filed July 31, 1956
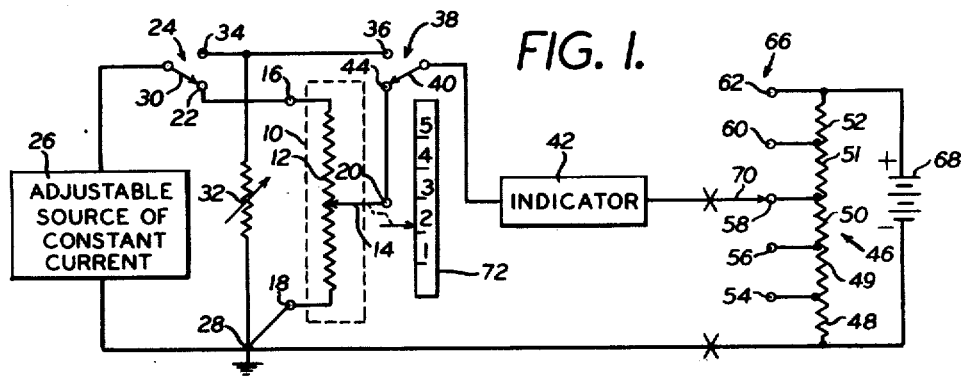
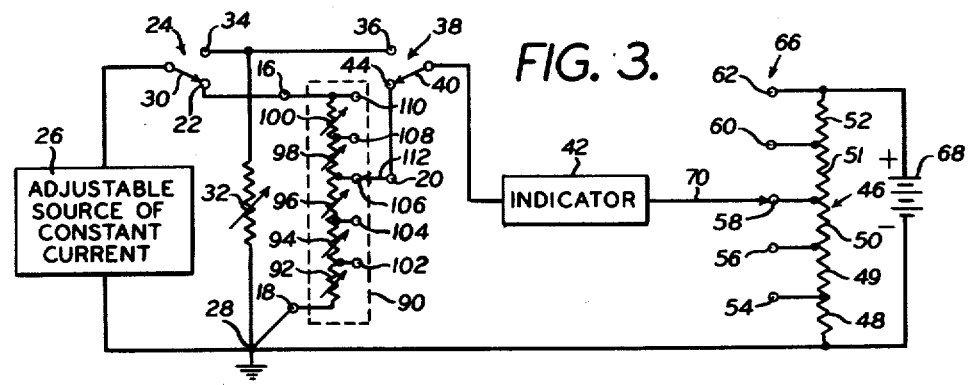
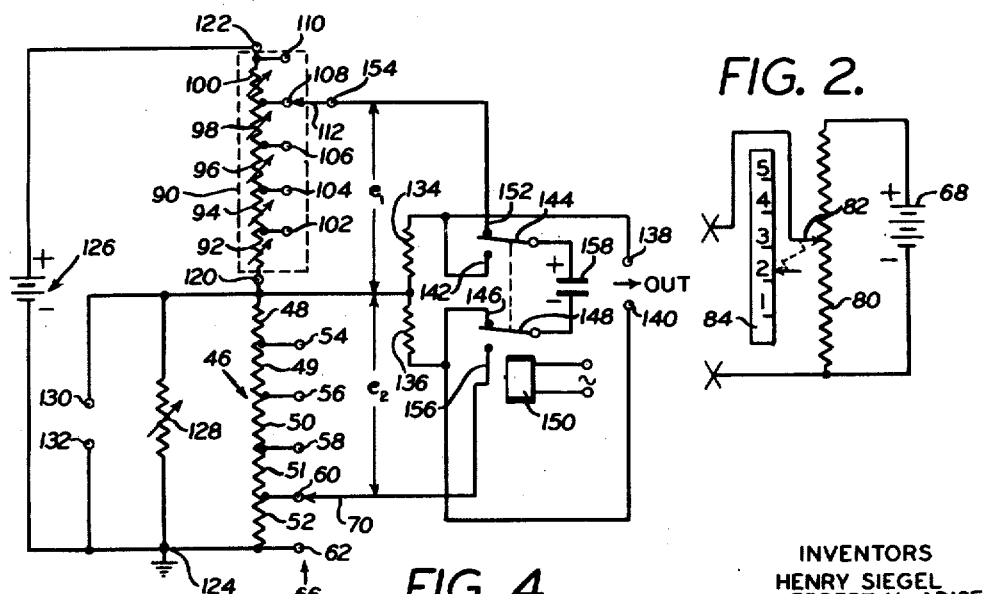
INVENTORS
HENRY SIEGEL
HERBERT H. ADISE.
BY *Churchill, Rick, Weymouth & Engel*
ATTORNEYS.

United States Patent Office 2,803,799
Patented Aug. 20, 1957

2,803,799

VOLTAGE DIVIDER CALIBRATING APPARATUS

Henry Siegel and Herbert H. Adise, Great Neck, N. Y.

Application July 31, 1956, Serial No. 601,174

14 Claims. (Cl. 324—63)

The present invention relates to apparatus for use in calibrating voltage dividers. More particularly, the invention relates to apparatus useful in the calibration or adjustment of voltage dividers of potentiometers having a resistance element connected between a pair of end terminals and having tap means for selectably effecting a connection to any one of a plurality of tapping points thereon.

There are many applications in the electrical or electronic art wherein it is desirable or necessary to have a highly accurate voltage divider. In certain cases, it is necessary that the total resistance of the resistance element of the divider have a prescribed magnitude. At the same time, it may be necessary to know the location of discrete tapping points which will afford desired percentages of the total resistance. In other instances it may not be essential that the total resistance be held to any particular value as long as the tapping points are suitably calibrated. In the one case, the measurements or calibration must be effected during manufacture in order that the tapping points and incremental portions of the resistance element may be suitably adjusted. In the other case a voltage divider or potentiometer whose manufacture is completed needs be calibrated in order to afford knowledge of its total resistance and the resistance between various tapping points. It may also be necessary to actually locate the tapping positions corresponding to particular percentages of the total resistance. The present invention provides an instrument which can be used in carrying out any of the various types of calibration just mentioned.

The apparatus embodying the present invention makes use of two standard or calibrated elements. The first is a variable resistor which is employed for establishing either alone or in conjunction with other elements, the measuring or calibrating base for the apparatus. The other element constitutes a standard voltage divider having a resistance element with selectable tapping points thereon, each point being calibrated as to its percentage or proportion of the total element. The apparatus is arranged to establish a flow of current through the standard voltage divider and through the voltage divider being calibrated. Means are provided for preselecting the ratio of the currents through the two dividers as a function of the magnitudes of the two standard or calibrated elements previously mentioned. This current ratio is then maintained constant throughout the measurement or adjustment. One of the principal unique features of the invention is that the current ratio may be established or maintained constant irrespective of the magnitude and variations in the total resistance of the divider being calibrated.

The apparatus embodying the invention may take one of several forms. In one form an adjustable source of constant current is provided for energizing the divider being calibrated. In the second form the divider under calibration is energized in series with the standard divider. In the last mentioned arrangement, the measurements are independent of variations or fluctuations in the supply voltage.

The invention will be better understood after reading the following detailed description with reference to the appended drawings, in which:

Fig. 1 is an electrical schematic circuit diagram of one embodiment of the invention demonstrating its use in calibrating a structurally complete potentiometer;

Fig. 2 is a fragmentary schematic circuit diagram showing a modification of the standard voltage divider of Fig. 1;

Fig. 3 is a schematic circuit diagram of a modification of the invention similar to Fig. 1, but showing its use in the manufacturing adjustment of a precision voltage divider; and Fig. 4 is a schematic circuit diagram of a separate embodiment of the invention.

Turning now to Fig. 1 of the drawing, there is shown within the dashed lines 10 a potentiometer which it is desired to calibrate. The potentiometer is shown as having a resistance element 12 and variable tap means in the form of a slider 14. The resistance element 12 is connected between a pair of test terminals 16 and 18 and the slider 14 is connected to a terminal 20. The test terminal 16 is connected to a fixed contact 22 of a single-pole, double-throw switch 24. An adjustable source of constant current, preferably direct current, designated by the reference numeral 26 is connected between a point of reference potential 28 and the armature or movable contact 30 of the switch 24. As is shown, the point of reference potential corresponds to ground potential for the apparatus. A variable resistor 32 is connected between the point 28 and a second fixed contact 34 of the switch 24. The end of the resistor 32 which is connected to the switch 24 is also connected to a fixed contact 36 of a further single-pole, double-throw switch 38. The movable contact 40 of the switch 38 is connected to one terminal of an indicating means 42. The switch 38 is provided with a second fixed contact 44 which is connected to the terminal 20. A standard voltage divider 46 is here shown as made up from a plurality of standard resistors 48, 49, 50, 51 and 52 connected in series. The tapping means for the standard divider takes the form of a plurality of fixed contacts 54, 56, 58, 60 and 62 of a multi-position switch 66. The taps 54, 56, 58 and 60 are located respectively at the corresponding junction between adjacent resistors 48 through 52. The tap 62 is located at one end of the standard divider. The opposite end of the standard divider is connected to the point 28. Current is supplied to the divider 46 by means of a source of direct current voltage 68. The switch 66 is provided with a movable contact 70 which is connected to a second terminal of the indicating means 42. The indicating means 42 may be any suitable device for indicating the passage of current between its terminals or for indicating inequality in the magnitude of the potential at its respective terminals.

Let it be assumed that it is desired to know the total resistance of the resistance element 12 and that it is further desired to locate four equally spaced tapping points thereon. For this purpose the standard voltage divider 46 should be provided with resistors 48 through 52 all of equal magnitude. However, the total series resistance thereof is not important. The switch 24 should be placed in the position shown in the drawing so as to energize the potentiometer 10. The slider 14 should now be moved to the extreme upper end of the element 12 to the point of maximum potential. Switch 38 should be in the position shown. The contact 70 of the switch 66 should be brought into engagement with the contact 62 so as to have applied thereto the maximum potential available from the divider 46. The adjustable source of current 26 should be varied until the indication of the indicating means 42 reads zero. Under these conditions the voltage drop across both resistance elements 12 and 46 will be equal. In order to ascertain the resistance of the element 12, switches 24 and 38 may both be thrown to their alternative positions. Now the variable resistor 32 will be energized by the source 26 which has been previously adjusted and the voltage drop across the resistor 32 can be compared with the voltage drop across the standard resistance element 46. The resistor 32 may now be adjusted to restore the indicating means 42 to zero. The resistance of resistor 32 may now be read off a calibrated dial (not shown) or otherwise measured. This resistance value will be equal to the total resistance of element 12.

To find the tapping points on the element 12, the switches 24 and 38 are restored to the positions shown in the drawing and the movable contact 70 of the switch 66 is brought into engagement with any one of its contacts 54, 56, 58 or 60. The slider 14 of the potentiometer being calibrated may then be positioned for zero reading on the indicating means 42. This establishes the location of the tap corresponding percentage-wise or proportionally to the particular tap selected on the standard voltage divider. The location of such taps may be indicated on an appropriate scale 72. By suitable choice of the resistors 48 through 52 any desired spacing between the selected or calibrated tapping points on potentiometer 10 may be obtained.

If it is desired to have available at any one time a wider range of calibrated tapping points, the standard voltage divider 46 of Fig. 1 may be replaced by a continuously variable potentiometer. The appropriate modification of the circuit in Fig. 1 is shown in Fig. 2. The portion shown in Fig. 2 is to be substituted in Fig. 1 for that much of the circuit appearing to the right of the symbols X—X. Referring to Fig. 2 the standard voltage divider is shown provided with a resistance element 80 having a slider 82 which is associated with a calibrated scale or dial 84. The element 80 is energized from the direct current source 68. The operation of the apparatus employing the modification of Fig. 2 should be self-evident.

Although the present apparatus is extremely useful for calibrating structurally complete potentiometers or voltage dividers in the manner described with reference to Figs. 1 and 2, it is uniquely adapted for calibrating such dividers when the calibration is effected by adjusting the resistance thereof. This is particularly true when adjustment of the resistance changes the total resistance of the resistance element. The application of the circuit of Fig. 1 to this latter form of calibration is illustrated in Fig. 3. The same reference characters are employed to designate the same or identical parts as previously defined in Fig. 1. In Fig. 3 the potentiometer to be calibrated is shown within the dashed lines 90. It has been arbitrarily assumed that the resistance element of the potentiometer under calibration is divided into five separate portions which are each independently adjustable in any well known manner. The five portions are designated in the drawing by the numbers 92, 94, 96, 98 and 100. The tap means is here illustrated as being of the stepped or switched variety having fixed contacts 102, 104, 106, 108 and 110. These contacts can be selectably engaged by the movable contact 112. The movable contact 112 is connected to the terminal 20 of the apparatus whereas the opposite ends of the entire resistance element are connected to the test terminals 16 and 18.

The operation of the calibrating apparatus in Fig. 3 differs somewhat from the operation described with reference to Fig. 1. This is due to the nature of the voltage divider being calibrated. In Fig. 1 it was assumed that the total resistance of the resistance element 12 remains constant. This is not true of the total resistance of the elements 92 through 100.

Let it be assumed that we are constructing a potentiometer which we wish to have a total resistance of $x$ ohms. Let it further be assumed that we wish each of the taps 102 through 110 to represent increasing percentages of the total resistance in accordance with a desired law of proportionality. The law of proportionality will again be established by the relative sizes of the subordinate resistances 48 through 52 of the standard voltage divider 46. In other words, if it is desired, for example, that the tap 102 on the divider under calibration takes in ten percent of the total resistance of such divider, then resistor 48 of the standard divider should be equal to ten percent of the total resistance of the resistors 48 through 52.

In order to establish the calibration base, that is, the $x$ ohms value, for the resistance element of the divider being calibrated, the variable resistor 32 is adjusted so that its resistance is equal to $x$ ohms. The switches 24 and 38 are both thrown to engage their respective contacts 34 and 36. The movable contact 70 of the switch 66 is brought into engagement with its contact 62. The variable resistor 32 will now be energized by the source 26 whereas the standard divider 46 will be energized by the source 68. The indicator 42 will be in position to compare the voltage drop between the contact 62 and the grounded end of the divider 46 with the voltage drop between the contact 36 and the grounded end of resistor 32. The source 26 is now adjusted until the two voltage drops are equal and the indicating means 42 shows zero or minimum reading. This establishes the desired current ratio for the standard divider and the divider being calibrated.

The switches 24 and 38 are now thrown to the positions shown in the drawing. The movable contact 112 of the divider 90 is now brought into engagement with its first or lowermost contact 102. The movable contact 70 of the standard divider is brought into engagement with the first standard contact 54. The resistance of the portion 92 of the divider 90 is now adjusted until the indication of the indicating means 42 is zero or minimum. Since the source 26 is arranged to provide constant current for any single adjustment thereof, the current through the element or portion 92 will remain constant during its adjustment. Once portion 92 is properly adjusted the contacts 112 and 70 may each be moved to the next higher contact, respectively, 104 and 56. The resistance portion 94 is now adjusted until the indicating means 42 shows balance. This procedure is repeated for the portions 96, 98 and 100 in that order. A little reflection will show that upon completing adjustment of the last portion 100 so that the potential at contact 110 is equal to the potential at contact 62, the total resistance of the divider 90 will be equal to the preselected resistance of the resistor 32 which in turn is equal to $x$ ohms.

Although the voltage divider 90 has been illustrated as having a plurality of fixed tapping points or contacts 102 through 110, these contacts may actually represent selected angular positions of a wiper arm on a continuously variable potentiometer.

It can be shown that the currents through the resistance elements of the standard divider and the divider being calibrated can be represented by the following equation:

$$\frac{I_s}{I_t} = \frac{R_c}{R_s}$$

wherein $I_s$ and $I_t$ are the currents through the standard resistance member 46 and resistance element 90, respectively, $R_c$ is the preselected resistance of variable resistor 32, and $R_s$ is the resistance of the standard resistance member 46.

If it is not convenient to employ an adjustable source of constant current, then the circuit shown in Fig. 4 may be used. For convenience in description, the voltage divider to be calibrated is shown as identical to the one shown in Fig. 3. In Fig. 4 the divider 90 has its resistance element including the portions 92 through 100 connected between the terminals 120 and 122. The standard voltage divider 46 is the same as that in Fig. 3 and has one end connected to the terminal 120 with the other end connected to ground at point 124. A source of direct current voltage 126 is connected between the terminal 122 and the ground point 124. Thus the resistance element of the divider 90 is energized in series with the standard resistance member 46. A variable resistor 128 is connected in parallel with the resistance element of the standard voltage divider, as shown. A pair of test terminals 130 and 132 are connected across the resistor 128 and standard divider in parallel. By connecting a suitable ohmeter or the like to the terminals 130 and 132, the parallel resistance of the elements 128 and 46 may be determined. In the circuit under discussion, the calibrating base is determined by the value of the resistance between terminals 130 and 132. This value is controlled or preselected by the adjustment of resistor 128. If the resistor 128 has a suitably calibrated dial, the test terminals 130 and 132 may be eliminated. Thus the proper setting of the resistor 128 is such that the parallel resistance of the elements 128 and 46 is equal to the aforementioned $x$ ohms. It should be noted that the "zero" end of the standard voltage divider 46 is at the test terminal 120 and not at ground potential. Thus the neutral point for comparing the voltage drops across the standard divider and divider under test is at the terminal 120.

In order to compare the two voltage drops which are now of opposite polarity, there is provided an arrangement which will now be described. A pair of matched resistors of equal value, 134 and 136, are connected, respectively, between the terminal 120 and separate output terminals 138 and 140. The terminal 138 is also connected to a first fixed contact 142 associated with a relay armature 144. The terminal 140 is connected in similar manner to a fixed contact 146 associated with a second relay armature 148. The two armatures 144 and 148 are controlled in unison by the winding 150 which is energized from a source of alternating current. The relay winding 150 is polarized such that the armatures 144 and 148 oscillate between opposite contacts with each alternation of the energizing current. The armature 144 has associated with it a second fixed contact 152 which is connected to the terminal 154 and that in turn is connected to the movable contact 112 of the divider being calibrated. The armature 148 has associated with it a further fixed contact 156 which is connected to the movable contact 70 of the standard divider 46. A condenser 158 is connected between the armatures 144 and 148.

The adjustment of the resistance element of the voltage divider 90 is accomplished by first establishing the calibration base. To do this, the variable resistor 128 is adjusted as previously mentioned so that the resistance between terminals 130 and 132 is equal to the desired $x$ ohms. The currents now flowing through the resistance element of the divider 90 and the standard resistance member 46 will bear a preselected ratio with respect to one another. It can be shown in the instant case that the currents through the resistance elements of the standard divider and the divider being calibrated can be represented by the following equation:

$$\frac{I_s}{I_t} = \frac{R_c}{R_s + R_c}$$

wherein $I_s$ and $I_t$ are the currents through the standard resistance element 46 and resistance element 90, respectively, $R_c$ is the preselected resistance of the variable resistor 128, and $R_s$ is the resistance of the standard resistance element 46.

With a balanced amplifier or the like responsive to an A. C. signal connected to the terminals 138 and 140, and the switching relay 150 energized, the further calibration of divider 90 may be carried out. The movable switch contacts 70 and 112 are positioned respectively in engagement with their first fixed contacts 54 and 102. As with the embodiment of Fig. 3, the resistance portion 92 of the divider 90 may be adjusted until the voltage drop between contact 102 and terminal 120 is equal to the voltage drop between contact 54 and terminal 120. Although the current flowing through the resistance element of the divider 90 will vary during adjustment the current through the standard resistance member 46 will vary in proportionate amount to maintain the ratio constant. The movable contacts 70 and 112 can be successively positioned in engagement with the fixed contacts 56, 58, 60 and 62, on the one hand, and the fixed contacts 104, 106, 108 and 110, on the other hand. The resistance portions 94, 96, 98 and 100 may then be adjusted in sequence in similar manner to the adjustment of portion 92. It will be appreciated that after the final adjustment of the resistance portion 100, the total resistance of the resistance element of the voltage divider 90 will be equal to the value $x$.

As yet no mention has been made of the operation of the indicating circuit employed in Fig. 4. This arrangement is believed to be somewhat unique and does afford extremely good sensitivity. Similar to the indicating means employed in Figs. 1 and 3, the circuit in Fig. 4 is intended for providing a null indication.

As previously stated, the relay winding 150 is supplied with alternating current. This causes the armatures 144 and 148 to oscillate between their two operative positions. Thus the accumulated voltage on condenser 158 is alternately compared with the voltages $e_1$ and $e_2$ as shown on the drawing. If any inequality exists a suitable charging or discharging current will flow to render the voltage on the condenser 158 equal to the voltage $e_1$ or $e_2$ depending upon to which it is connected at the particular instant. It will be appreciated that the current flowing through the condenser will pass through either the resistor 134 or the resistor 136.

Considering the circuit as a whole, three possible conditions can exist. Either $e_1 = e_2$ or $e_1$ is greater than $e_2$ or finally $e_2$ is greater than $e_1$. Let it be assumed that $e_2$ is greater than $e_1$. Let it be further assumed that the time constants of the circuit are so related to the switching rate of the relay that the condenser 158 will have at the moment of switching either the voltage $e_2$ or $e_1$. Therefore, at the exact instant of switching or reversal of position of the armatures 144 and 148, the voltage appearing across the resistor 134 or 136 will be equal to $e_2 - e_1$. Immediately prior to switching, when the voltage on the condenser 158 has substantially approached equalization, the voltage across the resistor 134 or 136 will have dropped to substantially zero. As a very rough approximation, the average voltage appearing across the resistor 134 or 136 can be represented as $$\frac{e_2 - e_1}{2}$$

Under the assumed condition that $e_2$ is greater than $e_1$, the terminal 140 will be driven negative with respect to terminal 120 at the instant that terminal 138 is at the same potential as the terminal 120. When the potential at terminal 140 has returned to that at terminal 120, then the potential at terminal 138 will be driven negative in a similar manner. The net result is the production of an alternating voltage. This voltage can be amplified with a balanced A. C. amplifier and indicated by a suitable meter.

Another way of expressing the operation is that as long as $e_2$ is greater than $e_1$ a series of negative voltage pulses will alternately appear across the resistors 134 and 136 with respect to the terminal 120. If $e_1$ is greater than $e_2$ then the polarity of the pulses will become positive with respect to terminal 120. This is equivalent to a phase shift of 180° and may or may not be detected by the indicating device, as desired. In either case as the magnitude of $e_1$ approaches the magnitude of $e_2$, the signal appearing between the terminals 138 and 140 will approach zero or null.

If desired, the function performed by the relay 150 and its associated armatures may be performed by a suitable electronic switching device. It is also possible to employ the indicating means of Fig. 4 in the embodiment of Fig. 1 or Fig. 3. If such a substitution is made, the junction between the resistors 134 and 136 would be connected to the ground point 28.

The described apparatus will be seen to provide a simple, accurate and reliable calibrating aid for the calibration or adjustment of voltage dividers or potentiometers, but it is to be understood that the invention is not limited to the specific embodiments herein illustrated and described, but may be modified, as will be understood by those skilled in the art, without departing from its spirit as defined by the following claims.

What we claim is:

1. Apparatus for use in calibrating voltage dividers of the type having a resistance element connected between a pair of end terminals and having tap means for selectably effecting a connection to any one of a plurality of tapping points thereon, comprising a standard voltage divider having a standard resistance element with a given total resistance connected between a pair of end terminals and having tap means for selectably effecting connection to said standard element at any one of a plurality of calibrating tapping points thereon, the calibrated points being chosen such that the resistance of the standard element between each calibrated point and one of said end terminals associated therewith is related in accordance with a pre-selected law of proportionality, means connected to the end terminals of said standard element and arranged for connection to the end terminals of the divider element to be calibrated for establishing a flow of current through both elements, means for adjusting said flow of current so that the currents through each element assume a selected ratio, said last mentioned means including means for maintaining said current ratio constant, and indicating means for connection to said tap means of each divider for comparing the voltage drop across the standard divider between its tap means at a calibrated point and said one end terminal with the voltage drop across the divider being calibrated between its tap means and one of its end terminals, whereby the proportional relationship of the resistance of the divider being calibrated between selected tap points on its resistance element and said one end terminal thereof can be established in accordance with said preselected law of proportionality independent of any difference between the total resistance of the element being calibrated and said given resistance of said standard element.

2. Apparatus according to claim 1, wherein the means for establishing a flow of current through each resistance element comprises a source of direct current voltage connected to the end terminals of said standard element and an adjustable source of constant direct current for connection to the end terminals of the divider element to be calibrated.

3. Apparatus according to claim 1, wherein the means for establishing a flow of current through each resistance element comprises a source of direct current voltage connected to the end terminals of said standard element and an adjustable source of constant direct current for connection to the end terminals of the divider element to be calibrated, and wherein the means for adjusting said flow of current so that the currents through each element assume a selected ratio comprises a variable resistor whose resistance can be preset to establish the calibrating base for the apparatus, switch means for alternatively connecting said source of constant current to said variable resistor or to said divider being calibrated, and means for selectably connecting said indicating means to said variable resistor for comparing the voltage drop thereacross with the voltage drop across said standard divider.

4. Apparatus according to claim 1, wherein said standard voltage divider comprises a plurality of standard resistors connected in series and a multi-position switch coupled to the junctions between said resistors for selectably effecting connection thereto.

5. Apparatus according to claim 1, wherein said standard voltage divider comprises a potentiometer having a resistance element and a slider, and a calibrated position indicator for said slider.

6. Apparatus according to claim 1, wherein the means for establishing a flow of current through each resistance element comprises a pair of test terminals for connection to the end terminals of the resistance element being calibrated, a source of direct current voltage, and means connecting said source of voltage, said test terminals, and said standard resistance element in series.

7. Apparatus according to claim 1, wherein the means for establishing a flow of current through each resistance element comprises a pair of test terminals for connection to the end terminals of the resistance element being calibrated, a source of direct current voltage, and means connecting said source of voltage, said test terminals, and said standard resistance element in series, and wherein the means for adjusting said flow of current so that the currents through each element assume a selected ratio comprises a variable resistor connected in parallel with said standard resistance element and adjustable to establish the calibrated base for the apparatus.

8. Apparatus according to claim 1, wherein said indicating means comprises a condenser, switch means for alternately and repetitively connecting said condenser across the corresponding portions of said standard divider and said divider being calibrated with the polarity such that the polarity of the condenser charge remains constant, and means for detecting the quantity of charging current flowing through said condenser, said charging current being proportional to the inequality in the voltage drops being compared.

9. Apparatus for use in adjusting the resistance element of a potentiometer by the adjustment of successive portions thereof, comprising a standard resistance member, a source of direct current voltage connected across said resistance member, an adjustable tap for said resistance member having a plurality of calibrated tapping positions corresponding to predetermined percentages of the total resistance thereof, a pair of test terminals between which said resistance element can be connected, an adjustable source of constant direct current, an adjustable calibrated resistor whose resistance is adjustable to establish the total resistance of said resistance element, switch means for connecting said source of constant current across said calibrated resistor when in a first position and across said pair of test terminals when in a second position, means for comparing the voltage drops across said resistance member and said calibrated resistor when said switch means occupies its first position, said source of constant current being adjustable for rendering said voltage drops equal, and means for comparing the voltage drops across preselected percentages of said resistance member with those across corresponding portions of said resistance element when said switch is in said second position, whereby successive portions of said resistance element can be adjusted to the desired value by adjusting until said last mentioned corresponding voltage drops are equal.

10. Apparatus for use in adjusting the resistance element of a potentiometer by the adjustment of successive portions thereof, comprising a standard potentiometer having a standard resistance member with a plurality of calibrated tapping points thereon representing known percentages of the total resistance thereof, means for connecting one end of said standard resistance member to one end of said resistance element, an indicating device having first and second input terminals and responsive to the flow of current between said terminals, means selectably connecting said first input terminal to said calibrated tapping points, means for connecting said second input terminal to the variable tap means of the potentiometer being adjusted, means for establishing a flow of current through both said standard resistance member and said resistance element, and means for adjusting and maintaining constant the ratio of the currents through said standard resistance member and said resistance element during adjustment of the latter at a value which is independent of the resistance of said resistance element.

11. Apparatus for use in adjusting the resistance element of a potentiometer by the adjustment of successive portions thereof, comprising a standard potentiometer having a standard resistance member with a plurality of calibrated tapping points thereon representing known percentages of the total resistance thereof, means for connecting one end of said standard resistance member to one end of said resistance element, an indicating device having first and second input terminals and responsive to the flow of current between said terminals, means selectably connecting said first input terminal to said calibrated tapping points, means for connecting said second input terminal to the variable tap means of the potentiometer under adjustment, means for establishing a flow of current through both said standard resistance member and said resistance element, means including a calibrated variable resistor for adjusting and maintaining constant the ratio of the currents through said standard resistance member and said resistance element during adjustment of the latter at a value selected as a function of the resistance of said standard resistance member and of said variable resistor and independent of the resistance of said resistance element.

12. Apparatus according to claim 11, wherein said variable resistor is connected in parallel with said standard resistance member and said current ratio is defined by the equation $$\frac{I_s}{I_t} = \frac{R_c}{R_s + R_c}$$

wherein $I_s$ and $I_t$ are the currents through the standard resistance member and resistance element respectively, $R_c$ is a preselected resistance of said variable resistor, and $R_s$ is the resistance of said standard resistance member.

13. Apparatus according to claim 11, wherein said means for establishing a flow of current comprises an adjustable source of constant current, and wherein said means for adjusting the ratio of the currents comprises switch means for coupling said source alternatively to said variable resistor or to said resistance element and said ratio is defined by the equation $$\frac{I_s}{I_t} = \frac{R_c}{R_s}$$

wherein $I_s$ and $I_t$ are the currents through the standard resistance member and resistance element respectively, $R_c$ is a preselected resistance of said variable resistor, and $R_s$ is the resistance of said standard resistance member.

14. Apparatus for use in adjusting the resistance element of a potentiometer by the adjustment of successive portions thereof, comprising a standard potentiometer having a standard resistance member with a plurality of calibrated tapping points thereon representing known percentages of the total resistance thereof, a pair of test terminals between which said resistance element can be connected, a source of direct current voltage, means connecting said standard resistance member in series with said test terminals across said source, a variable resistor connected in parallel with said standard resistance member, means for indicating the parallel resistance of said standard resistance member and said variable resistor for establishing the total resistance of said resistance element, first and second resistors connected respectively between first and second output terminals and the junction between said standard resistance member and a test terminal, a condenser, and switching means coupled to said condenser and to said output terminals for connecting said condenser in a first position of said switching means between said first output terminal and a terminal for connection to the tapping means on said potentiometer being adjusted, and for connecting said condenser in a second position of said switching means between said second output terminal and means for effecting selectable connection to said calibrated tapping points.

References Cited in the file of this patent

UNITED STATES PATENTS

| | | |
|---|---|---|
| 2,469,465 | Hamilton | May 10, 1949 |
| 2,648,037 | Harrison | Aug. 4, 1953 |
| 2,649,571 | Smith | Aug. 18, 1953 |

UNITED STATES PATENT OFFICE

CERTIFICATE OF CORRECTION

Patent No. 2,803,799 August 20, 1957

Henry Siegel et al.

It is hereby certified that error appears in the printed specification of the above numbered patent requiring correction and that the said Letters Patent should read as corrected below.

Column 7, line 26, for "calibrating" read -- calibrated --; column 8, line 25, for "calibrated" read -- calibrating --.

Signed and sealed this 15th day of October 1957.

(SEAL)
Attest:

KARL H. AXLINE
Attesting Officer

ROBERT C. WATSON
Commissioner of Patents